(12) United States Patent
Shanmugam

(10) Patent No.: US 11,102,395 B2
(45) Date of Patent: Aug. 24, 2021

(54) GENERATION OF MEDIA CONTENT HAVING MULTI-FOCUS VIDEO AND MULTI-DIRECTIONAL AUDIO

(71) Applicant: SONY CORPORATION, Tokyo (JP)

(72) Inventor: Sankar Shanmugam, Bangalore (IN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/542,534

(22) Filed: Aug. 16, 2019

(65) Prior Publication Data

US 2021/0051274 A1 Feb. 18, 2021

(51) Int. Cl.

| | |
|---|---|
| *H04N 5/232* | (2006.01) |
| *H04R 1/40* | (2006.01) |
| *H04R 3/00* | (2006.01) |
| *H04N 5/225* | (2006.01) |
| *H04N 7/01* | (2006.01) |
| *G06F 3/01* | (2006.01) |
| *G06T 7/00* | (2017.01) |

(52) U.S. Cl.
CPC ....... *H04N 5/232127* (2018.08); *G06F 3/012* (2013.01); *G06F 3/013* (2013.01); *G06T 7/0002* (2013.01); *H04N 5/2258* (2013.01); *H04N 5/23216* (2013.01); *H04N 5/23238* (2013.01); *H04N 5/232935* (2018.08); *H04N 5/232945* (2018.08); *H04N 7/0127* (2013.01); *H04R 1/406* (2013.01); *H04R 3/005* (2013.01); *G06T 2207/30168* (2013.01)

(58) Field of Classification Search
None
See application file for complete search history.

(56) References Cited

U.S. PATENT DOCUMENTS

| | | | | |
|---|---|---|---|---|
| 5,686,957 | A | * | 11/1997 | Baker .................. G02B 3/0087 348/14.07 |
| 8,817,092 | B2 | | 8/2014 | Wilkinson |
| 9,824,427 | B2 | | 11/2017 | Pulli et al. |
| 10,681,342 | B2 | * | 6/2020 | Walkingshaw ...... H04N 13/344 |
| 2010/0245655 | A1 | * | 9/2010 | Ou .......................... G02B 7/36 348/345 |
| 2017/0150045 | A1 | * | 5/2017 | Goswami ............... H04N 5/265 |
| 2018/0013949 | A1 | | 1/2018 | Han |
| 2018/0191945 | A1 | * | 7/2018 | Chen ................ H04N 5/232122 |
| 2019/0313187 | A1 | * | 10/2019 | Stoltze ................... H04R 1/406 |

\* cited by examiner

*Primary Examiner* — Kate H Luo
(74) *Attorney, Agent, or Firm* — Chip Law Group

(57) ABSTRACT

An electronic apparatus and a method for generation of media content having multi-focus video and multi-directional audio, is provided. The electronic apparatus includes an image-capture device and determines plurality of focus windows on a field-of-view (FOV) region of the image-capture device. The electronic apparatus control the audio-capture device to capture a plurality of audio references based on the determined plurality of focus windows. The electronic apparatus further controls the image-capture device to capture a sequence of image frames of the FOV region. Each image frame of the sequence of image frames is captured while a focus point of the image-capture device is set on a corresponding focus window of the determined plurality of focus windows. The electronic apparatus generates media content based on the captured sequence of frames and captured plurality of audio references.

20 Claims, 10 Drawing Sheets

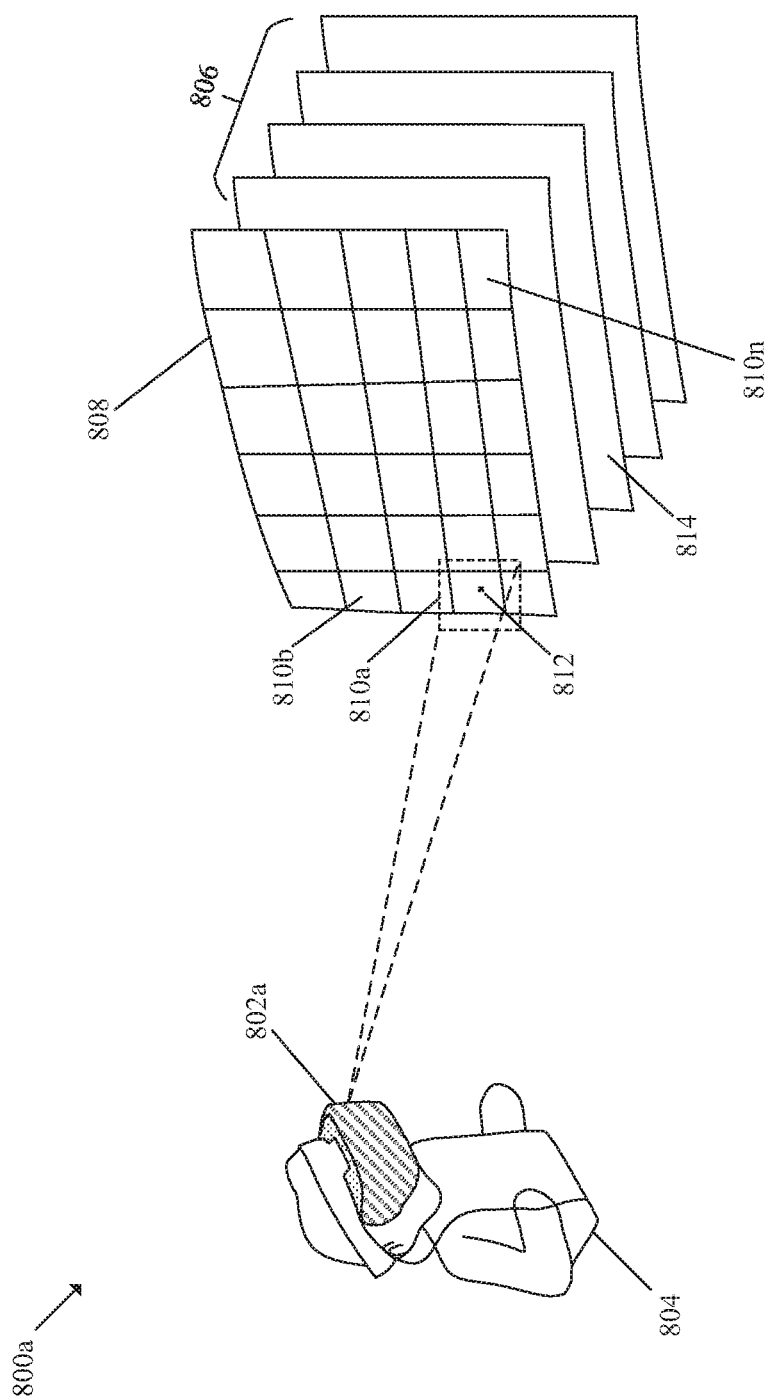

GENERATION OF MEDIA CONTENT HAVING MULTI-FOCUS VIDEO AND MULTI-DIRECTIONAL AUDIO

CROSS-REFERENCE TO RELATED APPLICATIONS/INCORPORATION BY REFERENCE

None.

FIELD

Various embodiments of the disclosure relate to camera technologies. More specifically, various embodiments of the disclosure relate to an electronic apparatus and a method for generation of media content having multi-focus video and multi-directional audio.

BACKGROUND

Recent advancements in camera technologies have led to development of various types of cameras that capture videos while setting focus points on different parts of a scene being captured in the videos. Typically, a user may control a conventional camera to capture a video in which either the entire scene is in focus or some of the desired parts of the scene appear in focus while other undesired regions appear blurry. Another user who watches the video may wish to see a specific part of the entire scene in focus. In case the specific part of the scene in the video appears out-of-focus, the user may lose interest in the video or may switch to a different video.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic apparatus and a method for generation of media content having multi-focus video and multi-directional audio is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIG. 8a is a diagram of an exemplary scenario for playback of media content on a wearable display device, in accordance with an embodiment of the disclosure.

DETAILED DESCRIPTION

The following described implementations may be found in the disclosed electronic apparatus and method for media content having multi-focus video and multi-directional audio. Exemplary aspects of the disclosure provide an electronic apparatus that includes an image-capture device and circuitry communicatively coupled to an audio-capture device and the image-capture device. The circuitry may be configured to determine a plurality of focus windows on a field-of-view (FOV) region of the image-capture device (for example a camera or an imaging sensor) and control the audio-capture device (for example a multi-direction audio recorder or a multi-microphone setup) to capture a plurality of audio references from a corresponding plurality of audio-capture directions based on the determined plurality of focus windows. The circuitry may be configured to control the image-capture device to capture a sequence of image frames of the FOV region. Each image frame of the sequence of image frames may be captured while a focus point of the image-capture device is set on a corresponding focus window of the determined plurality of focus windows. The circuitry may be further configured to generate media content based on the captured sequence of frames and captured plurality of audio references.

In contrast with conventional approaches, the electronic apparatus provides an approach to capture the sequence of image frame, without a need for a user to specify every focus window on the FOV region and to manually adjust a focus point over every focus window on the FOV region. The electronic apparatus also provides an approach to capture the plurality of audio references, without a need for a user to manually select each of the plurality of audio-capture directions. The electronic apparatus establishes a relationship between a focus window and a corresponding audio-capture direction to control the audio-capture device to capture the plurality of audio-references.

At a rendering side, the disclosure provides flexibility by providing a different user with the capability to select a desired focus window from the determined plurality of focus windows. This may be done so as to let the different user determine which portion of the FOV region should be in focus while the media content is rendered onto a display device. For example, if the generated media content is a part of a television interview where a first focus window is on a region that includes an interviewer and an interviewee of the television interview and a second focus window is on another region that includes a music band playing background music for the television interview. The different user may be given an option to select one of the first focus window or the second focus window, i.e. whether to watch the television interview with a focus on the interviewer and the interviewee or on the music band.

Figure 1:
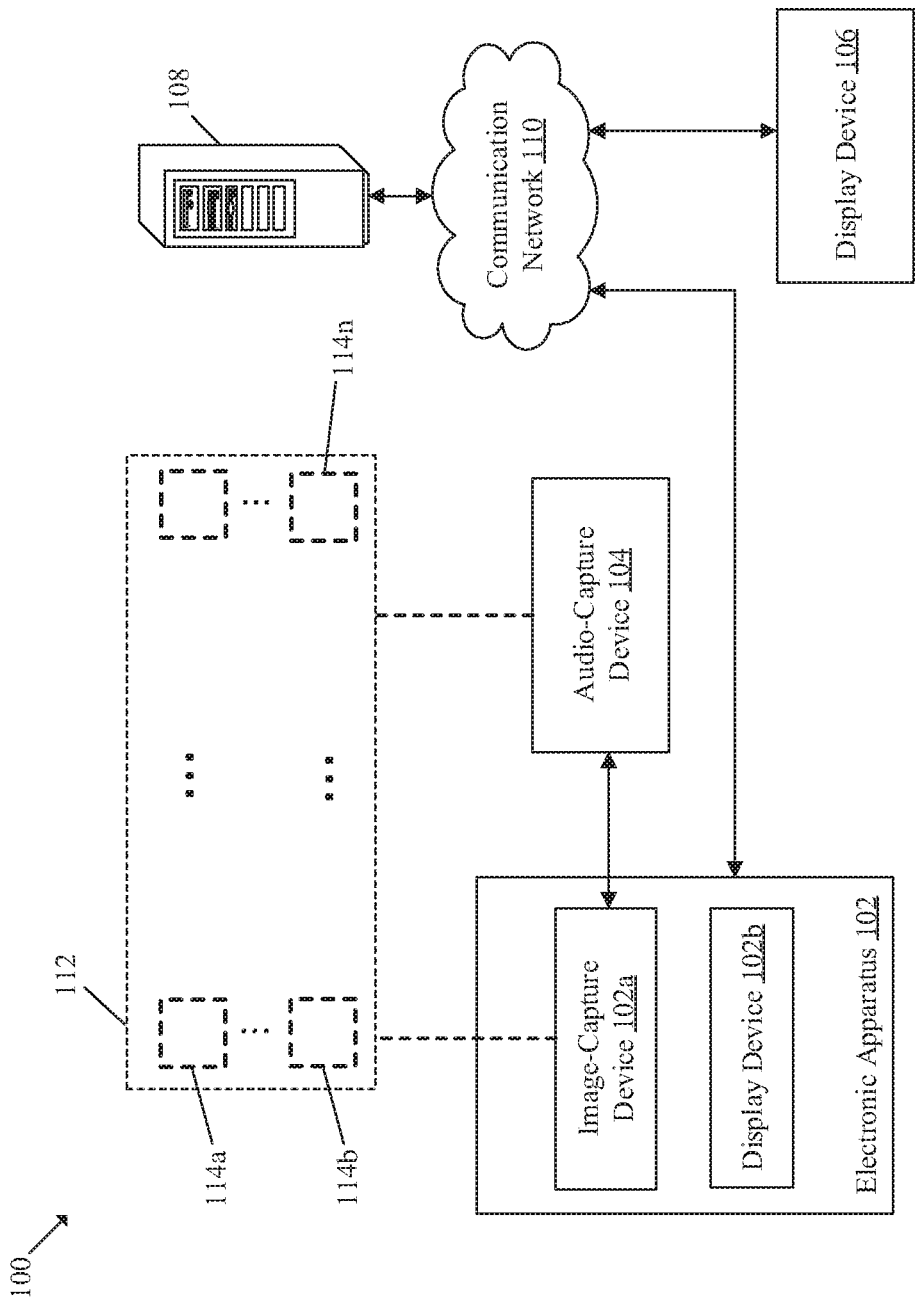
FIG. 1 is a diagram that illustrates an exemplary environment for generation of media content having multi-focus video and multi-directional audio, in accordance with an embodiment of the disclosure.

FIG. 1 is a diagram that illustrates an exemplary environment for generation of media content having multi-focus video and multi-directional audio, in accordance with an embodiment of the disclosure. With reference to FIG. 1, there is shown a network environment 100. The network environment 100 includes an electronic apparatus 102, an audio-capture device 104, a display device 106, a server 108, and a communication network 110. The electronic apparatus 102 may include an image-capture device 102a and a display device 102b. The electronic apparatus 102, the audio-capture device 104, the display device 106, and the server 108 may be communicably coupled to each other, via the communication network 110. There is further shown a field-of-view (hereinafter, referred to as "FOV") region 112 of the image-capture device 102a and a plurality of focus windows 114a, 114b . . . 114n on the FOV region 112.

In FIG. 1, the audio-capture device 104 is shown as a separate entity from the electronic apparatus 102. However, the disclosure may not be so limiting and in some exemplary embodiments, the audio-capture device 104 may be integrated with the electronic apparatus 102. Additionally, or alternatively, the entire functionality of the audio-capture device 104 may be incorporated in the electronic apparatus 102, without a deviation from the scope of disclosure.

The electronic apparatus 102 may comprise suitable logic, circuitry, and interfaces that may be configured to determine the plurality of focus windows 114a, 114b . . . 114n on the FOV region 112 of the image-capture device 102a. The electronic apparatus 102 may be further configured to control the audio-capture device 104 to capture a plurality of audio references from a corresponding plurality of audio-capture directions based on the determined plurality of focus windows 114a, 114b . . . 114n. The electronic apparatus 102 may be further configured to control the image-capture device 102a to capture a sequence of image frames of the FOV region 112. Each image frame of the sequence of image frames may be captured while a focus point of the image-capture device 102a is set on a corresponding focus window of the determined plurality of focus windows 114a, 114b . . . 114n. The electronic apparatus 102 may be further configured to generate media content based on the captured plurality of audio references and the captured sequence of image frames. Examples of the electronic apparatus 102 may include, but are not limited to, a video processing device, a video editing system, a video editing controller, a computer workstation, a mainframe computer, a handheld computer, a mobile phone, a smart appliance, a video player, a digital camera, a video camera, a server, and/or any computing device with image acquisition and processing capability.

The image-capture device 102a may comprise suitable logic, circuitry, and interfaces that may be configured to capture a sequence of image frames of the FOV region 112 which corresponds to a FOV of the image-capture device 102a. The image-capture device 102a may include a single image sensor. Alternatively, the image-capture device 102a may correspond to a multi-camera setup and may include a plurality of image sensors. Each image sensor of the plurality of image frames may be either included in a separate device enclosure or in a single device enclosure. In this implementation, each image-sensor may be configured and arranged to have a common FOV, i.e. the FOV region 112. Alternatively, the image-capture device 102a may be a 360° camera with a 360° FOV. Examples of the image-capture device 102a may include, but is not limited to, an image sensor, a portable computer, a 360° camera, a cellular/mobile phone, a smart appliance, a digital camera, a video camera, a multi-camera setup on a camera rig, a camera phone, and/or other computing device with image acquisition capability.

The display device 102b may comprise suitable logic, circuitry, and interfaces that may be configured to render a user interface (UI) that includes a plurality of UI elements. A UI element of the UI may be used to display a preview (live or recorded) of a sequence of image frames of the FOV region 112 and to further overlay the plurality of focus windows 114a, 114b . . . 114n on the FOV region 112. Additionally, in certain instances, one or more UI elements of the UI may be used to display a set of user-selectable options related to, for example, a mode selection option, a preview option, an image adjustment option, a camera calibration option, options related to audio-settings, and the like. Examples of the display device 102b may include, but is not limited to, at least one of a Liquid Crystal Display (LCD) display, a Light Emitting Diode (LED) display, a plasma display, or an Organic LED (OLED) display technology, or other display devices associated with the image-capture device 102a. In some exemplary instances, the display device 102b may be a touch screen that enables a user to provide a user-input via the touch screen.

The audio-capture device 104 may comprise suitable logic, circuitry, and interfaces that may be configured to capture a plurality of audio references from a corresponding plurality of audio-capture directions. In an exemplary embodiment, the audio-capture device 104 may be a directional recording device. Alternatively, in other embodiments, the audio-capture device 104 may correspond to a multi-microphone setup and may include a plurality of unidirectional microphones placed in the vicinity of (or attached to) different objects-of-interest in the FOV region 112 of the image-capture device 102a. Examples of the audio-capture device 104 may include, but is not limited to, a set of unidirectional microphones, a Lavelier microphone, a directional recording device, an omnidirectional microphone, a shotgun microphone, a cardioid microphone, and/or other devices with audio capturing capability.

The display device 106 may comprise suitable logic, circuitry, and interfaces that may be configured to execute playback of a portion of the media content for a user associated with the display device 106. The media content may be generated based on the captured sequence of image frames and the captured plurality of audio-references. As an example, the portion may include audio reference(s) of object(s)-of-interest from specific audio-capture direction(s) and a set of image frames that have the object(s)-of-interest in focus for a specific focus window over the FOV region 112. Other regions in each of the set of image frames may appear out-of-focus, blurry, or with a lower Depth-Of-Field (DOF) than that for the specific focus window. Examples of the display device 106 may include, but is not limited to, a Liquid Crystal Display (LCD) display, a Light Emitting Diode (LED) display, a plasma display, or an Organic LED (OLED) display technology, or other display devices. In accordance with an embodiment, the display device 106 may be a head mounted device (HMD), a smart-glass device, a see-through display, a projection-based display, an electro-chromic display, or a transparent display.

The server 108 may comprise suitable logic, circuitry, and interfaces that may be configured to render a storage service and/or a media streaming service for a network of display devices, for example, the display device 106. The media content generated by the electronic apparatus 102 may be stored on the server 108 and further streamed to one or more display devices among the network of display devices based on request(s) for playback of at least a portion of the user-generated media content on the one or more display devices. The server 108 may be implemented as a cloud server which may execute operations through web applications, cloud applications, HTTP requests, repository operations, file transfer, and the like. Other examples of the server 108 may include, but are not limited to a database server, a file server, a web server, a media server, an application server, a mainframe server, a cloud server, or other types of servers.

In one or more embodiments, the server 108 may be implemented as a plurality of distributed cloud-based resources by use of several technologies that are well known to those skilled in the art. A person with ordinary skill in the art will understand that the scope of the disclosure may not be limited to implementation of the server 108 and the electronic apparatus 102 as separate entities. In certain embodiments, the functionalities of the server 108 may be incorporated in its entirety or at least partially in the electronic apparatus 102, without a departure from the scope of the disclosure.

The communication network 110 may include a communication medium through which the electronic apparatus 102, the display device 106, and the server 108 may communicate with each other. The communication network 110 may be a wired or a wireless communication network. Examples of the communication network 110 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity(Li-Fi), 802.16, IEEE 802.11s, IEEE 802.11g, multi-hop communication, wireless access point (AP), device to device communication, cellular communication protocols, and Bluetooth (BT) communication protocols.

In operation, the image-capture device 102a may be set up in a recording environment to acquire image frames of the FOV region 112. Similarly, the audio-capture device 104 may be setup in accordance with one or more audio-sources that appear in the FOV region 112 and are present in the recording environment. By way of example, the electronic apparatus 102 may be configured to operate in a "Normal" mode. In the "Normal" mode, the electronic apparatus 102 may be configured to display a real-time video feed of the FOV region 112 onto the display device 102b, as projected by a lens assembly on a sensor core of the image-capture device 102a. An initial user input may be provided to the electronic apparatus 102 to switch from the "Normal" mode to a "Live Audio" mode. In the "Live Audio" mode, the electronic apparatus 102 may be configured to execute a set of operations to generate media content by capturing multi-focus video of the FOV region 112 and multi-direction audio from different object(s)-of-interest in the FOV region 112. The set of operations executed by the electronic apparatus 102 are briefly described herein and further details are provided, for example, in FIGS. 3, 4, 5, 6, 7, 8a, and 8b.

In some embodiments, the electronic apparatus 102 may be configured to display a set of user-selectable options on the display device 102b so as to allow a user to select one of a manual mode or an automatic mode. The manual mode or the automatic mode may appear as an additional user-selectable option after the selection of the "Live Audio" mode. The manual mode may provide a user-selectable option to select or specify a number of focus windows on the FOV region 112 of the image-capture device 102a. Additionally, or alternatively, the manual mode may provide a user-selectable option to select a default focus widow on the FOV region 112. The default focus window may correspond to a region on the FOV region 112, for which all image frames with a focus on the default focus window may be rendered by default on the display device 106. Additionally, or alternatively, the manual mode may provide a user-selectable option to change a size or a position of a focus window on the FOV region 112 so as to include a region of an object-of-interest in the focus window. Optionally, the manual mode may provide a user-selectable option to select an audio-capture direction for an audio reference of the object-of-interest.

On the contrary, the automatic mode may provide a user-selectable option to select a maximum number of focus windows (e.g., "16" by default) on the FOV region 112 of the image-capture device 102a. Additionally, or alternatively, various methods may be implemented after the selection of the automatic mode to, for example, detect a plurality of object(s)-of-interest in the FOV region 112 or to determine a plurality of audio-capture directions that point to a corresponding plurality of audio sources. Additionally, or alternatively, the automatic mode may provide a user-selectable option to select only a single focus window, i.e. a default focus window in the center of the FOV region 112. The user may be allowed to a change a size or a position of the default focus window on the FOV region 112.

The electronic apparatus 102 may be configured to determine the plurality of focus windows 114a, 114b . . . 114n on the FOV region 112 of the image-capture device 102a. In some embodiments, the plurality of focus windows 114a, 114b . . . 114n may be determined based on one or more user inputs that may be received over the set of user-selectable options. For example, the plurality of focus windows 114a, 114b . . . 114n may be determined based on whether the manual mode or the automatic mode is selected and/or based on an input to select a position and/or a size of a focus window, or a number of focus windows over the FOV region 112.

The electronic apparatus 102 may be further configured to control the audio-capture device 104 to capture a plurality of audio references from the corresponding plurality of audio-capture directions based on the determined plurality of focus windows 114a, 114b . . . 114n. Each focus window of the plurality of focus windows 114a, 114b . . . 114n may be determined such that a corresponding audio reference is available from an object-of-interest within the corresponding focus window. The electronic apparatus 102 may be further configured to control the image-capture device 102a to capture a sequence of image frames of the FOV region 112. Each image frame of the sequence of image frames may be captured while a focus point of the image-capture device 102a is set on a corresponding focus window of the determined plurality of focus windows 114a, 114b . . . 114n provided the image-capture device 102a is set in one of the manual mode or the automatic mode.

The electronic apparatus 102 may be further configured to generate media content based on the captured plurality of audio references and the captured sequence of image frames. The generated media content may be either transmitted to the server 108 for storage or for streaming services to a network of display devices, for example, the display device 106. Additionally, or alternatively, the electronic apparatus 102 may be configured to directly stream the media content to the network of display devices.

Figure 2:
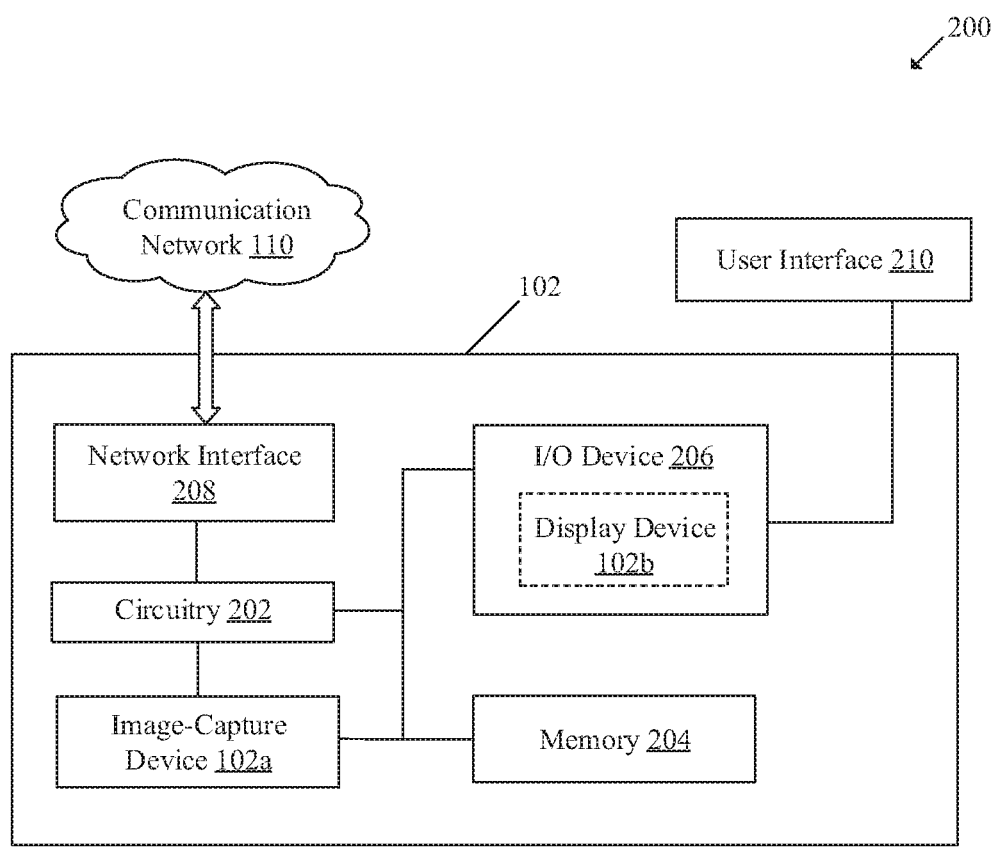
FIG. 2 is a block diagram of an exemplary electronic apparatus for generation of media content having multi-focus video and multi-directional audio, in accordance with an embodiment of the disclosure.

FIG. 2 is a block diagram of an exemplary electronic apparatus for generation of media content having multi-focus video and multi-directional audio, in accordance with an embodiment of the disclosure. FIG. 2 is explained in conjunction with elements from FIG. 1. With reference to FIG. 2, there is shown a block diagram 200 of the electronic apparatus 102. The electronic apparatus 102 includes circuitry 202, a memory 204, an input/output (I/O) device 206, the image-capture device 102a, the display device 102b, a network interface 208, and a user interface 210. The display device 102b may be part of the I/O device 206, for example. The circuitry 202 may be communicatively coupled to the memory 204, the I/O device 206, the image-capture device 102a, the network interface 208, and the user interface 210.

The circuitry 202 may comprise suitable logic, circuitry, and interfaces that may be configured to execute instructions stored in the memory 204. The executed instructions may correspond to at least a set of operations which may include, for example, a determination of a plurality of focus windows on the FOV region 112 of the image-capture device 102a, a control over the audio-capture device 104 to capture a plurality of audio-references, a control over the image-capture device 102a to capture a sequence of image frames, and a generation of media content based on the captured sequence of image frames and the captured plurality of audio-references. The circuitry 202 may be implemented based on a number of processor technologies known in the art. Examples of the circuitry 202 may include, but are not limited to, a Central Processing Unit (CPU), a Graphical Processing Unit (GPU), a co-processor, x86-based processor, a Reduced Instruction Set Computing (RISC) processor, an Application-Specific Integrated Circuit (ASIC) processor, a Complex Instruction Set Computing (CISC) processor, or a combination thereof.

The memory 204 may comprise suitable logic, circuitry, and interfaces that may be configured to store the instructions to be executed by the circuitry 202. Also, the memory 204 may be configured to store the generated media content. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may comprise suitable logic, circuitry, and/or interfaces that may be configured to act as an I/O channel/interface between the user and the electronic apparatus 102. The I/O device 206 may include various input and output devices, which may be configured to communicate with different operational components of the electronic apparatus 102. Examples of the I/O device 206 may include, but are not limited to, a touch screen, a keyboard, a mouse, a joystick, a microphone, and a display device (for example, the display device 102b).

The network interface 208 may comprise suitable logic, circuitry, and/or interfaces that may be configured to facilitate communication between the electronic apparatus 102 and the server 108, via the communication network 110. The network interface 208 may be implemented by use of various known technologies to support wired or wireless communication of the electronic apparatus 102 with the communication network 110. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as, but not limited to, Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The user interface 210 may be configured as a medium for the user to interact with the electronic apparatus 102 and may have a dynamic interface that changes according to the preferences set by the user and configuration of the electronic apparatus 102. In some embodiments, the user interface 210 may be a user interface of one or more applications installed on the electronic apparatus 102. The functions or operations executed by the electronic apparatus 102, as described in FIG. 1, may be performed by the circuitry 202. The operations executed by the circuitry 202 are described in detail, for example, in the FIGS. 3, 4, 5, 6, 7, 8a, and 8b.

Figure 3:
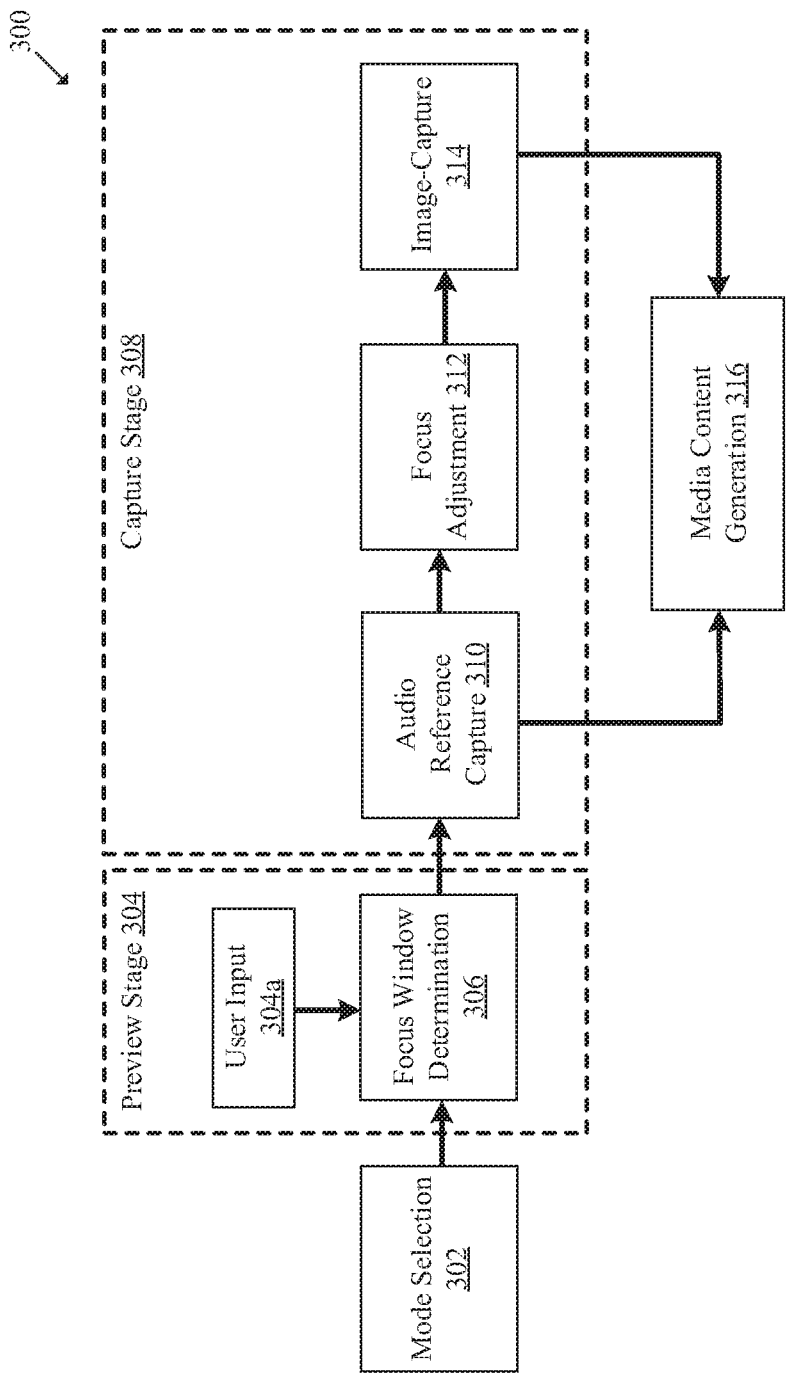
FIG. 3 is a diagram that illustrates exemplary set of operations for generation of media content having multi-focus video and multi-directional audio, in accordance with an embodiment of the disclosure.

FIG. 3 is a diagram that illustrates exemplary set of operations for generation of media content having multi-focus video and multi-directional audio, in accordance with an embodiment of the disclosure. FIG. 3 is explained in conjunction with elements from FIG. 1 and FIG. 2. With reference to FIG. 3, there is shown a block diagram 300 of exemplary set of operations from 302 to 316.

The memory 204 may be configured to store pre-programmed settings for a plurality of modes. Each mode of the plurality of modes may have a different pre-programmed setting for the image-capture device 102a and/or the audio-capture device 104. The image-capture device 102a and the audio-capture device 104 may initially operate in a "Normal" mode. In the "Normal" mode, the audio-capture device 104 may be configured to capture audio references from all directions, i.e. without a selection of specific audio-capture directions. Similarly, in the "Normal" mode, the image-capture device 102a may be configured to capture image frames of the FOV region 112, with all portions of the FOV region 112 in focus. The circuitry 202 may be configured to then package the image frames and the audio references in a timely manner to generate conventional media content.

At 302, a mode selection operation may be executed. In the mode selection operation, the circuitry 202 may be configured to receive an initial user input to switch the electronic apparatus 102 from the "Normal" mode to the "Live Audio" mode. The circuitry 202 may be further configured to select the "Live Audio" mode, based on the received initial user input. The initial user input may be received via the display device 102b.

For the "Live Audio" mode, the memory 204 may store pre-programmed settings for the image-capture device 102a to capture the sequence of image frames. Each image frame may have a specific portion of the FOV region 112 in focus based on a focus window provided in a manual mode (as described in FIG. 4) or an automatic mode (as described in FIG. 5) of the electronic apparatus 102. Additionally, in some instances, the memory 204 may also store pre-programmed settings for the audio-capture device 104 to capture the plurality of audio references from the corresponding plurality of audio-capture directions.

At 304, the electronic apparatus 102 may enter into a preview stage. In the preview stage, the circuitry 202 may be configured to project a view of the FOV region 112 onto the display device 102b and display a first set of user-selectable options, via the user interface 210. The set of user-selectable options may correspond to one of an automatic mode or a manual mode. The circuitry 202 may be further configured to receive a user input 304a corresponding to selection of one of the set of user-selectable options and load a configuration for the image-capture device 102a based on whether the received user input 304a corresponds to the manual mode or the automatic mode. Details of the automatic mode and the manual mode are described further in detail, for example, in FIGS. 4 and 5.

At 306, a focus window determination operation may be executed after the selection of one of the manual mode or the automatic mode. In the focus window determination operation, the circuitry 202 may be configured to determine a plurality of focus windows 114a, 114b . . . 114n on the FOV region 112 of the image-capture device 102a. The determination of the plurality of focus windows 114a, 114b . . . 114n may be based on whether the manual mode or the automatic mode is selected. In other words, conditions for the determination of the plurality of focus windows 114a, 114b . . . 114n may be different for the manual mode and the automatic mode. Details of the conditions for the manual mode and the automatic mode are described in detail, for example, in FIGS. 4 and 5.

The circuitry 202 may be further configured to determine a plurality of audio-capture directions based on the determined plurality of focus windows 114a, 114b . . . 114n on the FOV region 112. Alternatively, the circuitry 202 may be configured to detect a plurality of audio-sources in the FOV region 112 and determine the plurality of audio-capture directions based on the detection of the plurality of audio-sources. Alternatively, the circuitry 202 may be configured to determine the plurality of audio-capture directions based on a user selection of a plurality of object(s)-of-interest in the FOV region 112.

At 308, the electronic apparatus 102 may enter into a capture stage 314. In the capture stage, a sequence of image frames may be captured along with a plurality of audio references from a corresponding plurality of audio-directions.

At 310, an audio reference capture operation may be executed. In the audio reference capture operation, the circuitry 202 may be configured to control the audio-capture device 104 to capture a plurality of audio references from a corresponding plurality of audio-capture directions. Each of the determined plurality of focus windows 114a, 114b . . . 114n may correspond to an audio source and therefore, further correspond to an audio reference from the audio source.

For example, the FOV region 112 may include two audio sources, i.e. a human and a television. In this case, a first focus window and a second focus window may be determined to be on a first region and a second region of the FOV region 112, respectively. The first region and the second region may include the human and the television, respectively. A first audio-capture direction and a second audio-capture direction may be determined based on the first focus window and the second focus window. The audio-capture device 104 may be controlled to capture a first audio reference from the first audio-capture direction and a second audio-reference from the second audio-capture direction. Both the first audio reference and the second audio reference may be captured concurrently from the first audio-capture direction and the second audio-capture direction, respectively. Other audio references from other directions may be considered as noise and may be removed while capturing the first audio reference and the second audio reference. In certain instances, while capturing audio references from selected audio sources, some noisy audio sources may come close to the audio-capture device 104 than the selected audio sources. Additionally, or alternatively, one or more of the noisy audio sources may reach a location, from where they may have a direct impact on selected audio sources. In such instances, the audio-capture device 104 may detect such noisy audio sources and apply techniques related to active noise cancellation, passive noise cancellation, or adaptive noise cancellation so that the direct impact of the noisy audio sources may be removed or at least minimized to desired levels.

In some embodiments, the audio-capture device 104 may include a plurality of microphones configured in a multi-microphone setup, where each microphone of the plurality of microphones may be placed in proximity of (or in contact with) an audio source (i.e. an object-of-interest) in the FOV region 112 of the image-capture device 102a. For example, if the FOV region 112 includes a human, a TV, and a dog as three audio sources, three microphones may be placed in proximity of (or in contact with) the three audio sources (i.e. the human, the TV and the dog). Each microphone of the three microphones may be communicably coupled to the electronic apparatus 102 and may transmit an audio reference for an audio source proximal to the corresponding microphone.

At 312, a focus adjustment operation may be executed. In the focus adjustment operation, the circuitry 202 may be configured to control the image-capture device 102a to set a focus point on a focus window along an audio-capture direction from where a corresponding audio reference of the plurality of audio references is captured. Once an image frame of the FOV region 112 is captured while the focus point is set on the focus window, the focus point may be adjusted and set on a different focus window of the determined plurality of focus windows 114a, 114b . . . 114n. The above process may be repeated till an image frame for each focus window of the determined plurality of focus windows 114a, 114b . . . 114n is captured. By way of example, each focus window of the determined plurality of focus windows 114a, 114b . . . 114n may be selected one at a time in an iterative manner. With each iteration, an autofocus (AF) point may be set on the selected focus window and an image frame of the FOV region 112 may be captured while the AF point is set on the selected focus window. By way of another example, if the focus point is set on a focus window corresponding to a TV, the audio-capture device 104 may be configured to capture an audio reference that is produced by the TV along with audio references from other audio sources corresponding to other focus windows.

At 314, an image-capture operation may be executed. In the image-capture operation, the circuitry 202 may be configured to control the image-capture device 102a to capture a sequence of image frames of the FOV region 112. Each image frame of the sequence of image frames may be captured while the focus point of the image-capture device 102a is set on a corresponding focus window of the determined plurality of focus windows 114a, 114b . . . 114n.

By way of example, the image-capture operation be performed for a plurality of iterations. In each iteration of the plurality of iterations, a focus window may be selected from the determined plurality of focus windows 114a, 114b . . . 114n and a focus point may be set on the selected focus window. While the focus point is set, the image-capture device 102a may be controlled to capture an image frame of the FOV region 112. The above process may be repeated for each selected focus window of the determined plurality of focus windows 114a, 114b . . . 114n so as to obtain the sequence of image frames. Each image frame of the sequence of image frames of the FOV region 112 may include a common background region and a common foreground region; however, only a specific region of the corresponding image frame may remain in focus. The specific region of the corresponding image frame may belong to the focus window over which the focus point was set when the corresponding image frame was captured.

At 316, a media generation operation may be executed. In the media generation operation, the circuitry 202 may be configured to generate media content based on the captured plurality of audio references and the captured sequence of image frames. By way of example, the sequence of image frames and the plurality of audio references may be collectively packaged as frame data. In certain instances, metadata for the sequence of image frames and the plurality of audio references may be further packaged with the frame data.

It should be noted that operations 306 to 316 for the generation of the media content may be repeated for a plurality of iterations in time, until a user input or a trigger is received to pause or stop the process. Over a duration of the plurality of iterations, multiple sequences of image frames of the FOV region 112 may be captured along with multiple audio segments from the plurality of audio-capture directions. Each audio segment of the multiple audio segments may include a plurality of audio references for a corresponding sequence of image frames of the multiple sequences of image frames.

The circuitry 202 may be further configured to generate a sequence of media content items based on the multiple sequences of image frames and the multiple audio segments. Each media content item of the sequence of media content items may be generated by application of the media generation operation on a corresponding sequences of image frames of the multiple sequences of image frames and a corresponding audio segment of the multiple audio segments.

The circuitry 202 may be further configured to transmit the sequence of media content items to the display device 106 via the communication network 110. By way of example, at rendering side, the display device 106 may be configured to receive the sequence of media content items. A different user associated with the display device 106 may be provided with an option to select a portion of the FOV region 112 that corresponds to a first focus window of the determined plurality of focus windows 114a, 114b . . . 114n. The display device 106 may be further configured to extract a first image frame and a first audio reference from each media content item of the sequence of media content items. The first image frame may include the selected portion in focus and the first audio reference may be extracted based on a determination that the first audio reference is captured from an audio-capture direction which corresponds to the selected portion of the FOV region 112. The display device 106 may be configured to control playback of (or render) the extracted first image frame and the extracted first audio reference from each media content item of the sequence of media content items, onto the display device 106.

Figure 4:
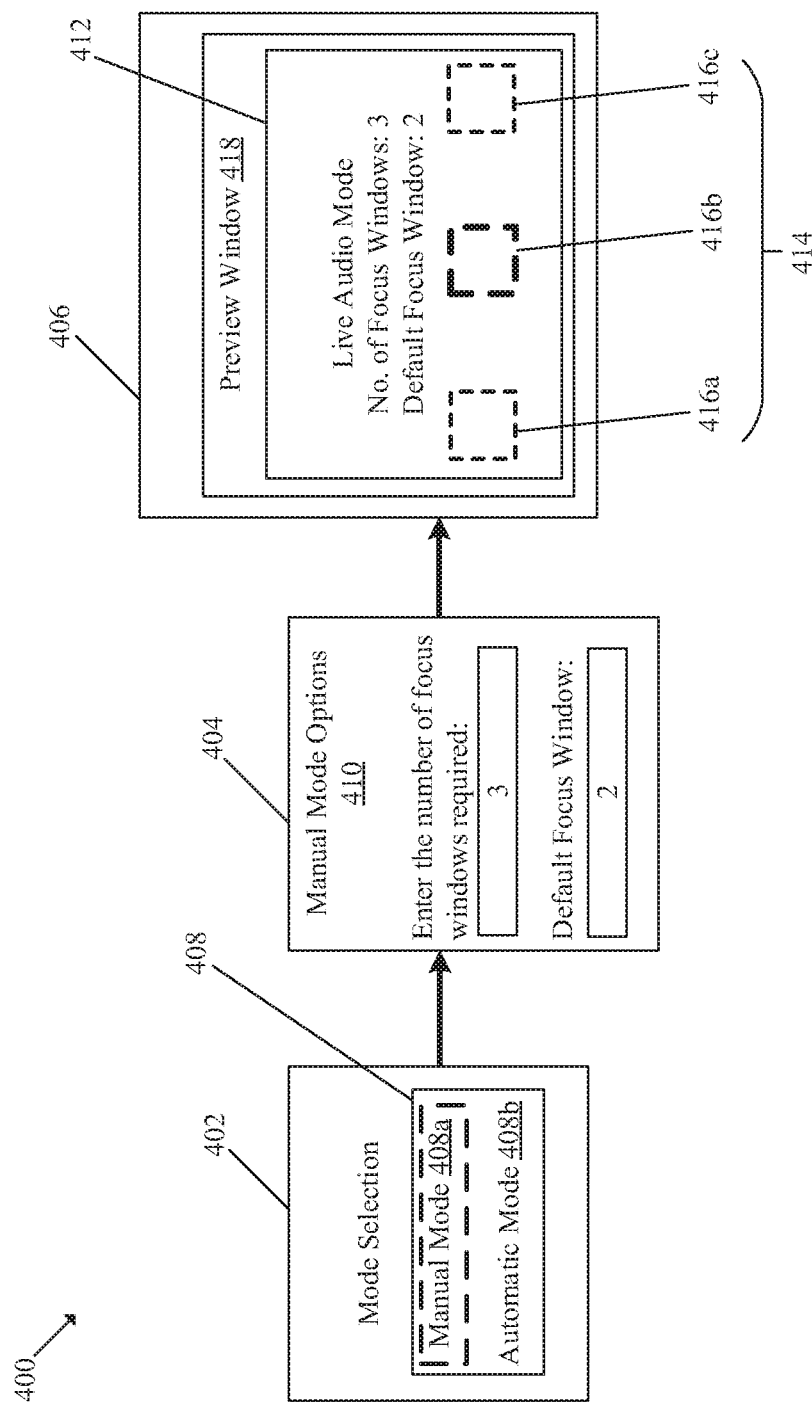
FIG. 4 is a diagram that illustrates exemplary manual mode operations for the electronic apparatus of FIG. 2, in accordance with an embodiment of the disclosure.

FIG. 4 is a diagram that illustrates exemplary manual mode operations for the electronic apparatus of FIG. 2, in accordance with an embodiment of the disclosure. FIG. 4 is explained in conjunction with elements from FIG. 1, FIG. 2, and FIG. 3. With reference to FIG. 4, there is shown a block diagram 400 that depicts exemplary manual mode operations from 400 to 406 in the preview stage.

At 402, a mode selection operation may be executed. In the mode selection operation, a set of user-selectable options 408 may be displayed onto the display device 102b. The circuitry 202 may be configured to display the set of user-selectable options 408 onto the user interface 210 of the display device 102b. As an example, the displayed set of user-selectable options 408 may include a manual mode 408a and an automatic mode 408b. The user associated with the electronic apparatus 102 may provide an initial user input to select the manual mode 408a from the displayed set of user-selectable options 408.

At 404, a set of manual mode options 410 may be displayed onto the user interface 210 of the display device 102b. The circuitry 202 may be configured to display the set of manual mode options 410 onto the user interface 210 of the display device 102b. The set of manual mode options 410 may require information about a number of focus windows to be placed on the FOV region 412 and a default focus window to be placed on the FOV region 412. The circuitry 202 may be further configured to receive a first user input 404a corresponding to a selection of the number of focus windows on the FOV region 412 of the image-capture device 102a. The circuitry 202 may be further configured to determine a plurality of focus windows 414 on the FOV region 412 based on the received first user input. The determined plurality of focus windows 414 may include a first focus window 416a, a second focus window 416b, and a third focus window 416c, as shown. As an example, the second focus window 416b may be selected as the default focus window.

Additionally, or alternatively, the circuitry 202 may be configured to detect a plurality of objects-of-interest in the FOV region 412 of the image-capture device 102a and compare a number of the detected objects-of-interest with the number of focus windows. Based on the comparison of the number of the detected objects-of-interest with the number of focus windows, the circuitry 202 may be further configured to determine the plurality of focus windows 414 on the FOV region 412 of the image-capture device 102a.

Additionally, or alternatively, the first user input may correspond to a selection of a number of audio sources present in the FOV region 412 of the image-capture device 102a. In such a case, the circuitry 202 may be configured to determine the plurality of focus windows 414 on the FOV region 412 of the image-capture device 102a based on the selection of the number of number of audio sources in the FOV region 412.

Additionally, or alternatively, the circuitry 202 may be configured to detect the plurality of objects-of-interest in the FOV region 412 of the image-capture device 102a and compare the number of the detected objects-of-interest with the selection of the number of number of audio sources in the FOV region 412. Based on the comparison of the number of the detected objects-of-interest with the number of audio sources, the circuitry 202 may be further configured to determine the plurality of focus windows 414 on the FOV region 412 of the image-capture device 102a.

By way of example, four objects-of-interest, such as an animal, a TV, a first human-speaker, and a second human-speaker may be detected in an example FOV region. The user may specify the number of focus windows as "3". In such an instance, the plurality of focus windows may include a first focus window for the first human-speaker, a second focus windows for the second human-speaker, and a third focus window for the TV. Additionally, in certain other instances, the user may be allowed to select whether to add an additional focus window over the animal.

In certain instances, the number of the detected objects-of-interest may be less than the number of focus windows specified via the first user input. In such instances, the circuitry 202 may be configured to determine the plurality of focus windows 414 based on the detected objects-of-interest. In certain other instances, the number of detected objects-of-interest may be more than the number of audio sources in the FOV region 412. In such instances, the circuitry 202 may be configured to determine the plurality of focus windows 414 based on the number of audio sources in the FOV region 412. In certain other instances, the number of the detected objects-of-interest may be more than the number of focus windows specified in the received first user input. In such instances, the circuitry 202 may be configured to determine the plurality of focus windows 414 based on the number of focus windows.

Additionally, or alternatively, the circuitry 202 may be configured to display a plurality of provisional focus windows onto the display device 102b. The plurality of provisional focus windows may be displayed as per a default template, for example, a grid-based template that partitions that FOV region 412 into "4×4" i.e. "16" grid cells. Alternatively, the plurality of provisional focus windows may be displayed based on the first user input or the detection of the plurality of objects-of-interest.

In some instances, the user may be allowed to select a default focus window from the displayed plurality of provisional focus windows on the FOV region 412 and the circuitry 202 may be configured to receive a user input corresponding to a selection of the default focus window of the plurality of provisional focus windows. The default focus window may correspond to a region on the FOV region 412, for which all image frames with a focus on the default focus window may be rendered by default on the display device 106 along with the corresponding audio references. In some embodiments, the default focus window may be selected while captured image frame(s) and audio reference(s) are played on the display device 106.

Additionally, or alternatively, the user may be allowed to change a position or a size of at least one focus window of the displayed plurality of focus windows 414. The circuitry 202 may be further configured to receive a third user input corresponding to a change in the size or the position of the at least one focus window of the plurality of provisional focus windows on the FOV region 412. Based on the received second user input and/or the third user input, the circuitry 202 may be configured to determine the plurality of focus windows 414 on the FOV region 412 of the image-capture device 102a. The user may be allowed to change the default focus window at any given point in time in the preview stage.

At 406, a preview window 418 for the "Live Audio" mode may be displayed onto the user interface 210 of the display device 102b. The circuitry 202 may be configured to display the FOV region 412 on the preview window 418 and the determined plurality of focus windows 414 on the FOV region 412. As an example, the preview window 418 may also indicate the number of focus windows (e.g., "3" focus windows), an index (e.g., "2" or $2^{nd}$ window) of the default focus window, and the determined plurality of focus windows 414 on the FOV region 412. In some instances, the preview window 418 may indicate at least one focus window whose size or position is changed based on the third user input.

Figure 5:
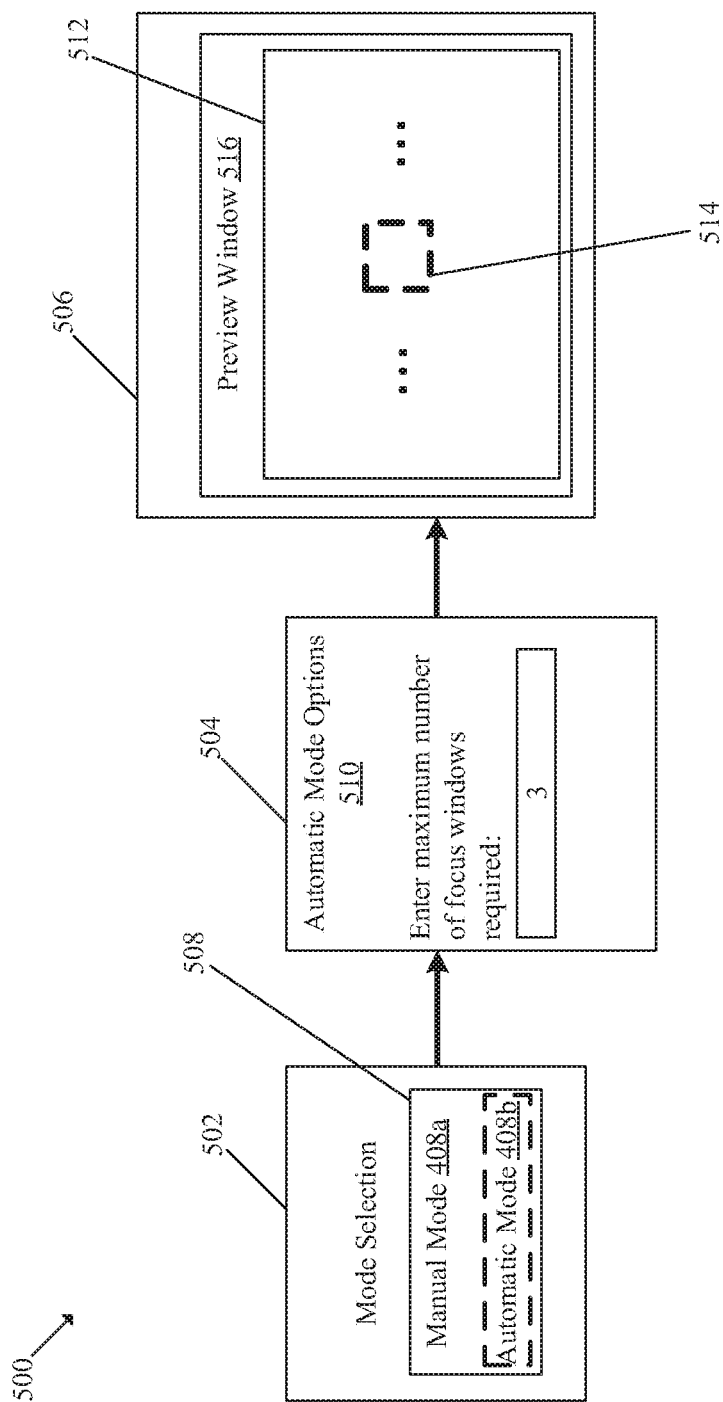
FIG. 5 is a diagram that illustrates exemplary automatic mode operations for the electronic apparatus of FIG. 2, in accordance with an embodiment of the disclosure.

FIG. 5 is a diagram that illustrates exemplary automatic mode operations for the electronic apparatus of FIG. 2, in accordance with an embodiment of the disclosure. FIG. 5 is explained in conjunction with elements from FIG. 1, FIG. 2, FIG. 3, and FIG. 4. With reference to FIG. 5, there is shown a block diagram 500 of exemplary automatic mode operations from 502 to 506 in the preview stage.

At 502, a mode selection operation may be executed. In the mode selection operation, a set of user-selectable options 508 may be displayed onto the display device 102b. The circuitry 202 may be configured to display the set of user-selectable options 508 onto the user interface 210 of the display device 102b. As an example, the displayed set of user-selectable options 508 may include a manual mode 508a or an automatic mode 508b. The user associated with the electronic apparatus 102 may provide an initial user input to select the automatic mode 508b from the displayed set of user-selectable options 508.

At 504, a set of automatic mode options 510 may be displayed onto the user interface of the display device 102b. The circuitry 202 may be configured to display the set of automatic mode options 510 onto the user interface 210 of the display device 102b. The set of automatic mode options 510 may include, for example, an option to specify a maximum number of focus windows for an FOV region 512 of the image-capture device 102a and/or a maximum number of audio-capture directions for the audio-capture device 104.

The circuitry 202 may be configured to receive a fourth user input corresponding to a selection of the maximum number of focus windows on the FOV region 512 of the image-capture device. The circuitry 202 may be further configured to determine a plurality of focus windows 514 on the FOV region 512 of the image-capture device based on the received fourth user input.

At 506, a preview window 516 for the "Live Audio" mode may be displayed onto the user interface 210 of the display device 102b. The circuitry 202 may be configured to display the preview window 516 so as to allow the user to view the size and the position of the determined plurality of focus windows 514 on the FOV region 512.

By way of example, the user may specify "5" as the maximum number of focus windows or audio-capture directions while only "4" objects-of-interest may be detected in the FOV region 512. Four focus windows may be determined for the "4" detected objects-of-interest. However, the preview window 516 may only display a default focus window 514a at the center of FOV region 512. The user may be allowed to change the size or the position of the default focus window 514a. In some embodiments, the circuitry 202 may be configured to select a center-most focus window from the determined plurality of focus windows 514 as the default focus window 514a. Alternatively, the circuitry 202 may be configured to select the default focus window 514a based on user-related information for example, user preferences or past selections of a focus window on a specific portion of the FOV region 512, or a past preference for an object type, .e.g., pets.

Figure 6:
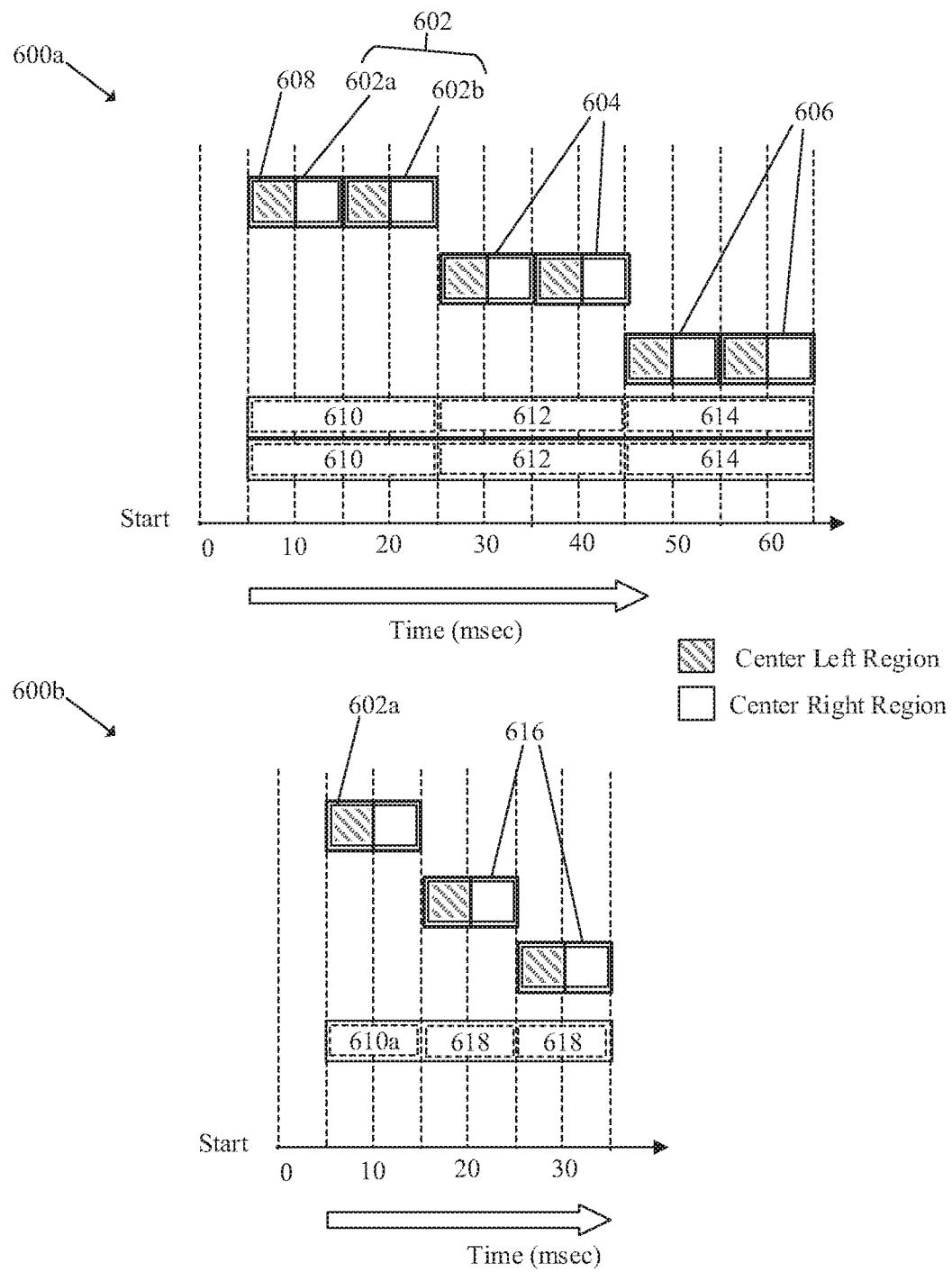
FIG. 6 illustrates example timelines for generation and playback of media content, in accordance with an embodiment of the disclosure.

FIG. 6 illustrates example timelines for generation and playback of media content, in accordance with an embodiment of the disclosure. FIG. 6 is explained in conjunction with elements from FIGS. 1, 2, 3, 4, and 5. With reference to FIG. 6, there is shown an example timeline 600a and an example timeline 600b.

The example timeline 600a shows a sequence of image frames 602, a sequence of image frames 604, and a sequence of image frames 606. Each of the sequence of image frames 602, the sequence of image frames 604, and the sequence of image frames 606 includes two image frames of an FOV region 608. However, a first image frame 602a of the sequence of image frames 602 includes a center left region in focus, whereas a second image frame 602b of the sequence of image frames 602 includes a center right region in focus. In order to capture the sequence of image frames 602, the circuitry 202 may be configured to control the image-capture device 102a to set a focus point on a first focus window over the center left region of the FOV region 608 and capture the first image frame 602a while the focus point is set on the first focus window. After the first image frame 602a is captured, the circuitry 202 may be configured to control the image-capture device 102a to set the focus point on a second focus window over the center right region of the FOV region 608 and capture the second image frame 602b while the focus point is set on the second focus window.

Once both the first image frame 602a and the second image frame 602b are captured, above operations to capture the sequence of image frames 602 are repeated for the sequence of image frames 604 and the sequence of image frames 606, respectively. Both the first image frame 602a and the second image frame 602b correspond to a time window of "5" milliseconds to "25" milliseconds. Similarly, the sequence of image frames 604 and the sequence of image frames 606 correspond to a time window of "25" miiliseconds-"45" milliseconds and a time window of "45" milliseconds-"65" milliseconds, respectively. In other words, each image frame of the sequence of image frames 602, the sequence of image frames 604, and the sequence of image frames 606 is captured within a duration of "10" milliseconds. As a result, the sequence of image frames 602, the sequence of image frames 604, or the sequence of image frames 606 are captured at a first frame rate of "1/100 milliseconds" or "100" frames per second (FPS).

The example timeline 600a further shows a plurality of audio references 610, a plurality of audio references 612, and a plurality of audio references 614 for the sequence of image frames 602, the sequence of image frames 604, and the sequence of image frames 606, respectively. Each audio reference of the plurality of audio references 610, the plurality of audio references 612, and the plurality of audio references 614 may correspond to an audio-capture direction that points to either the center left region or the center right region of the FOV region 608. The circuitry 202 may be configured to control the audio-capture device 104 to capture the plurality of audio references 610, simultaneously, for both the center left region and the center right region of the FOV region 608. Similarly, above operations to capture the plurality of audio references 610 may be repeated for the plurality of audio references 612 and the plurality of audio references 614, respectively. The circuitry 202 may be configured to package the sequence of image frames 602 and the plurality of audio references 610 so as to generate media content for the time window of "5" milliseconds to "25" milliseconds.

At playback or rendering end, the display device 106 may be configured to receive the media content for time window of "5" milliseconds to "25" milliseconds and media content for subsequent time windows so as to ensure playback up to a specific duration. A different user associated with the display device 106 may be allowed to select a focus window for one of the center left region or the center right region of the FOV region 608. In case the focus window over the center left region is selected, the display device 106 may be configured to extract the first image frame 602a and a first audio reference 610a from the received media content. Similarly, the display device 106 may be configured to extract first image frames 616 and first audio references 618 from the media content for the subsequent time windows. The display device 106 may be further configured to prepare playable media content based on the extracted first image frame 602a, the extracted first audio reference 610a, the extracted first image frames 616, and the extracted first audio references 618.

The example timeline 600b for the playable media content shows an arrangement of the extracted first image frame 602a and the extracted first image frames 616 for the subsequent time windows. The example timeline 600b further shows an arrangement of the first audio reference 610a and the first audio references 618 for the subsequent time windows. Since the playable media content may only include one image frame and one audio reference from the media content for each time window of "20 milliseconds", the display device 106 may be configured to control playback of the playable media content at a second frame rate of "50 FPS".

As a generalized result, if the sequence of image frames are captured at a first frame rate ($F_1$), then the circuitry 202 may be configured to determine a second frame rate ($F_2$) for playback of the generated media content on the display device 106. The second frame rate may be determined based on the determined plurality of focus windows. By way of example, the second frame rate may be determined based on a number of focus windows selected initially based on the first user input. If the number of focus windows is N and the first frame rate is $F_1$, then the second frame rate $F_2$ may be represented by equation (1), as follows:

$$F_2 = \frac{F_1}{N} \text{ (in } FPS) \tag{1}$$

For example, if $F_1$ is "100" FPS and N is "2", then $F_2$ may be determined as "100/2" FPS or "50" FPS.

It should be noted that the example timeline 600a, the example timeline 600b, and the equation (1) are only valid when the image-capture device 102a includes a single image sensor. In embodiments where the image-capture device 102a includes a plurality of image sensors, each image frame of the sequence of image frames may be captured simultaneously with a focus point on one of the determined plurality of focus windows. In such instances, if the number of focus windows is N and the first frame rate is $F_1$, then the second frame rate $F_2$ may be represented by equation (2), as follows:

$$F_2 = F_1 \text{(in FPS)} \qquad (2)$$

In other words, the media content can be rendered at the same frame rate at which the sequence of image frames is captured.

Figure 7:
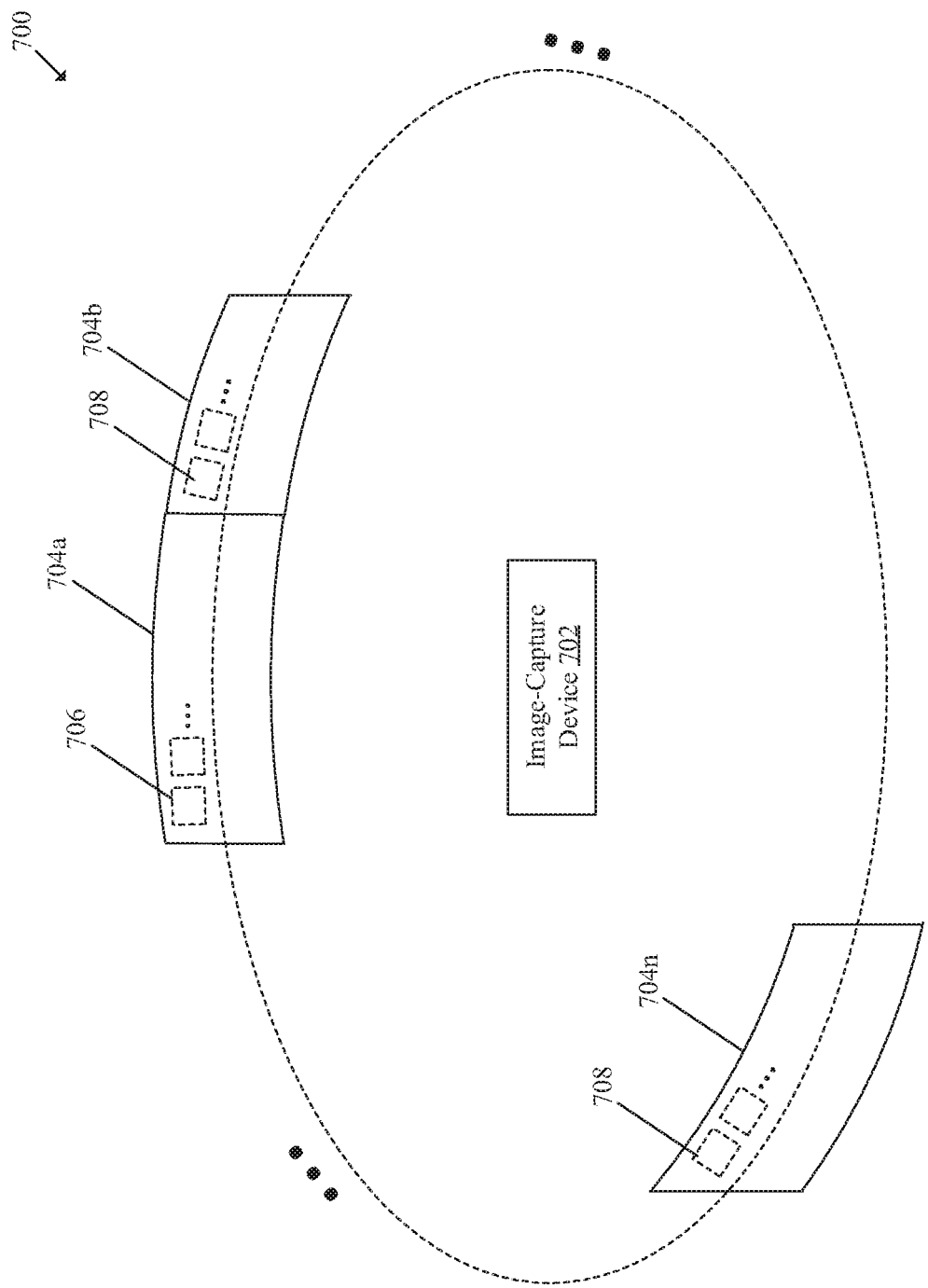
FIG. 7 is a diagram of an exemplary scenario that illustrate use of a 360° camera to capture a sequence of image frames, in accordance with an embodiment of the disclosure.

FIG. 7 is a diagram of an exemplary scenario that illustrates use of a 360° camera to capture a sequence of image frames, in accordance with an embodiment of the disclosure. FIG. 7 is explained in conjunction with elements from FIGS. 1, 2, 3, 4, 5 and 6. With reference to FIG. 7, there is shown a diagram 700 of an exemplary scenario.

In the exemplary scenario, there is shown an image-capture device 702, which is a 360° camera, also referred to as an omnidirectional camera. The 360° camera has either a spherical FOV around the 360° camera or at least a circular FOV (shown by dotted lines) in a horizontal plane, with the 360° camera at the center of the spherical FOV or the circular FOV. Therefore, the FOV of the 360° camera may be referred to as a 360° FOV that includes a plurality of FOV regions 704a, 704b . . . 704n.

The circuitry 202 may be configured to determine a plurality of focus windows 706 for an FOV region 704a and further configured to determine a subsequent plurality of focus windows 708 for each of the subsequent FOV region of the plurality of FOV regions 704a, 704b . . . 704n. The determination of the plurality of focus windows 706 and the subsequent plurality of focus windows 708 may be same as described in FIG. 4, for example.

The circuitry 202 may be further configured to control the audio-capture device 104 to capture a plurality of audio references for FOV region 704a from a corresponding plurality of audio-capture directions. The circuitry 202 may be further configured to control the audio-capture device 104 to capture a subsequent plurality of audio references from a subsequent plurality of audio-capture directions for each subsequent FOV region of the plurality of FOV regions 704a, 704b . . . 704n. The subsequent plurality of audio references for a subsequent FOV region of the plurality of FOV regions 704a, 704b . . . 704n may be captured based on the subsequent plurality of focus windows 708 for the subsequent FOV region.

The circuitry 202 may be further configured to control the image-capture device 702 to capture a sequence of image frames of the FOV region 704a and a subsequent sequence of image frames for each subsequent FOV region of the plurality of FOV regions 704a, 704b . . . 704n. Each image frame of the subsequent sequence of image frames may be captured while the focus point is set on a corresponding focus window of the subsequent plurality of focus windows 708 of a corresponding FOV region of the plurality of FOV regions 704a, 704b . . . 704n.

The circuitry 202 may be further configured to generate the media content for the FOV region 704a based on the captured sequence of image frames and the captured plurality of audio references. Additionally, the circuitry 202 may be configured to generate subsequent media content for each subsequent FOV region of the plurality of FOV regions 704a, 704b . . . 704n based on the captured subsequent sequence of image frames and the captured subsequent plurality of audio references.

In an exemplary scenario, at the rendering end, the circuitry 202 may be configured to generate playable media content that includes a sequence of 360° image frames for the 360° FOV. Each 360° image frame of the sequence of 360° image frames may be generated by dynamically selecting, from the generated media content and the generated subsequent media content, an image frame for each of the plurality of FOV regions 704a, 704b . . . 704n. Each dynamically selected image frame may correspond to same focus window or a different focus window and may be stitched together to form a 360° image frame of the sequence of 360° image frames.

FIG. 8a is a diagram of an exemplary scenario for playback of media content on a wearable display device, in accordance with an embodiment of the disclosure. FIG. 8a is explained in conjunction with elements from FIGS. 1, 2, 3, 4, 5, 6, and 7. With reference to FIG. 8a, there is shown a diagram 800a of an exemplary scenario.

In the exemplary scenario, there is shown a display device 802a that corresponds to a wearable display device, e.g., an HMD worn by a user 804. The user 804 may be different from the user associated with the electronic apparatus 102. The display device 802a may be configured to receive the media content from the electronic apparatus 102 or the server 108. The received media content may include a sequence of image frames 806 of an FOV region 808. The display device 802a may be configured to partition the FOV region 808 into a plurality of tiled regions 810a, 810b . . . 810n based on an image resolution of the sequence of image frames 806 in the received media content. The resolution of each image frame of the sequence of image frames 806 may be directly proportional to a number of tiled regions in the plurality of tiled regions 810a, 810b . . . 810n. By way of example, each tiled region of the plurality of tiled regions 810a, 810b . . . 810n may have a size in a range of "64 by 64" pixels to "256 by 256" pixels.

The display device 802a may be further configured to identify a gaze point 812 of user's eyeball on the display device 802a and select a first tile region 810a from the plurality of tiled regions 810a, 810b . . . 810n based on the identified gaze point 812. Additionally, or alternatively, the display device 802a may be configured to receive a user input corresponding to a selection of the first tile region 810a from the plurality of tiled regions 810a, 810b . . . 810n. Thereafter, the display device 802a may be configured to select the first tile region 810a from the plurality of tiled regions 810a, 810b . . . 810n based on the received user input.

The display device 802a may be further configured to determine a blur value of a region which corresponds to the selected first tile region 810a, in each image frame of the sequence of image frames 806. The display device 802a may be further configured to select a first image frame 814 having the region for which the determined blur value is a minimum. The blur value of the region may be indicative of whether the region is in focus or out-of-focus. Additionally, the region for which the blur value is the minimum may indicate that the first image frame 814 was captured while a focus point was set on a focus window over the region.

Additionally, or alternatively, the display device 802a may be configured to apply a grayscale operation on the region to generate a grayscale region. Thereafter, the display device 802a may be configured to convolve the grayscale region with a Laplacian Kernel to obtain a measure of a $2^{nd}$ derivative of the region. The Laplacian kernel may highlight areas of the region which includes rapid intensity changes and may be therefore used for edge detection. The display device 802a may be further configured to estimate a variance of a response of the convolution as a focus measure of the region and the focus measure may be compared with a threshold to determine the blur value of the region. The threshold value may be set based on a scene depicted in the first image frame 814 and may change if the scene changes. The focus measure of the region may be inversely proportional to the blur value of the region.

The display device 802a may be further configured to select, from the plurality of audio references in the received media content, a first audio reference that corresponds to the identified gaze point. Finally, the display device 802a may be configured to render the selected first image frame 814 and the selected first audio reference onto a display portion of the display device 802a.

Figure 8B:
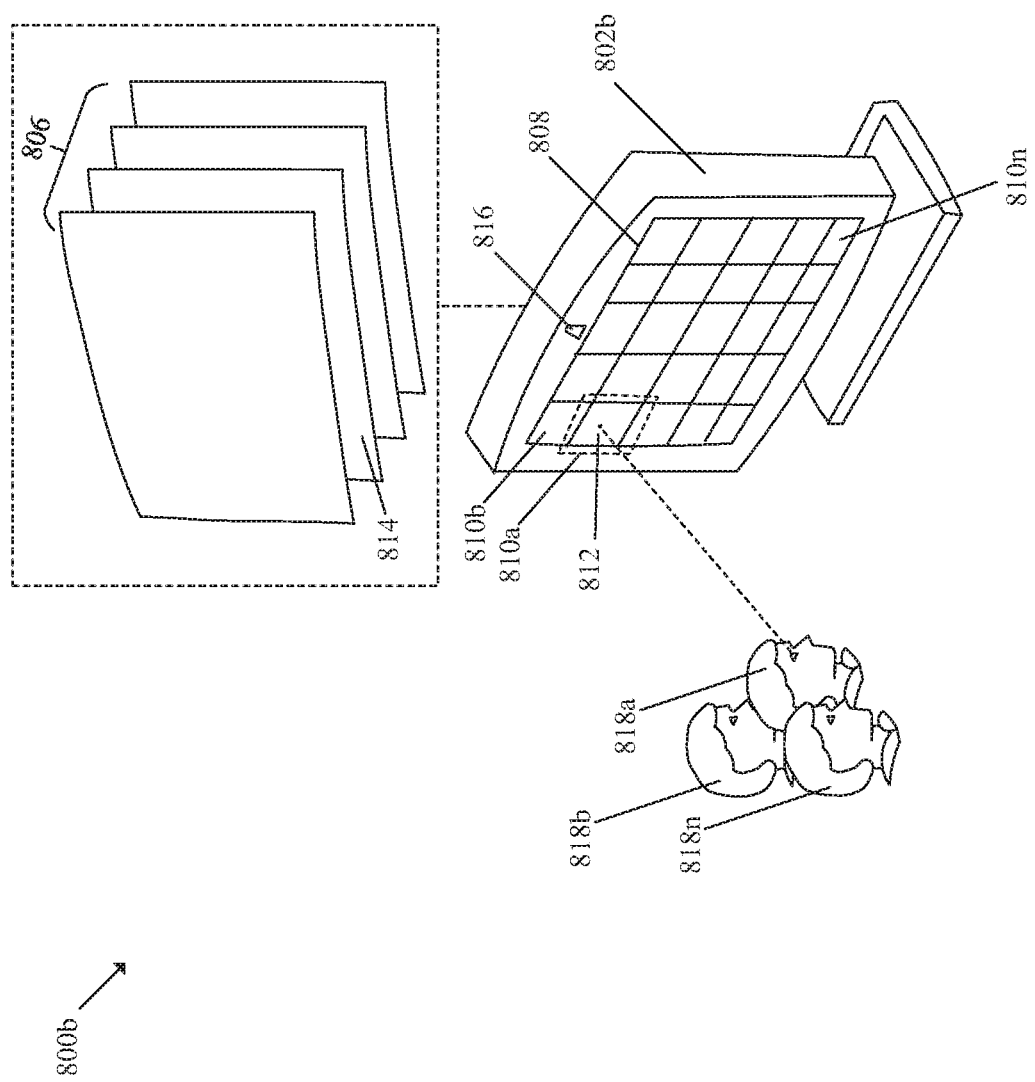
FIG. 8b is a diagram of an exemplary scenario for playback of media content on a non-wearable display device, in accordance with an embodiment of the disclosure.

FIG. 8b is a diagram of an exemplary scenario for playback of media content on a non-wearable display device, in accordance with an embodiment of the disclosure. FIG. 8b is explained in conjunction with elements from FIGS. 1, 2, 3, 4, 5, 6 and 7 and some of the elements of FIG. 8a. With reference to FIG. 8b, there is shown a diagram 800b of an exemplary scenario.

In the exemplary scenario, there is shown a display device 802b, for example, a television. The display device 802b may be a non-wearable device and may include a skeletal tracking sensor 816. The skeletal tracking sensor 816 may capture data, such as a number of user faces in FOV, a face angle, or an eye position, or a combination thereof. The display device 802b may be configured to determine, by the skeletal tracking sensor 816, a set of user-faces 818a, 818b, and . . . 818n that lie within a viewing angle of the display device 802b and select a first user-face 818a as a priority user-face from the determined set of user-faces 818a, 818b and . . . 818n. The first user-face 818a may be selected based on a selection criteria. Examples of the selection criteria may include, but are not limited to, user registration information on the display device 802b, past user interactions with the display device 802b, an age-based priority, and a preset priority list of users with face data.

The display device 802b may be configured to identify the gaze point 812 of the selected first user-face 818a on the display device 802b and select the first tile region 810a from the plurality of tiled regions 810a, 810b . . . 810n based on the identified gaze point 812. Additionally, or alternatively, the display device 802b may be configured to receive a user input corresponding to a selection of the first tile region 810a from the plurality of tiled regions 810a, 810b . . . 810n and select the first tile region 810a from the plurality of tiled regions 810a, 810b . . . 810n based on the received user input.

The display device 802b may be further configured to determine the blur value of the region corresponding to the selected first tile region 810a in each image frame of the sequence of image frames 806 and select the first image frame 814 frame for which the blur value is the minimum. The blur value of the region may be indicative of whether the region is in focus or out-of-focus. Additionally, the region for which the blur value is minimum may indicate that the first image frame 814 was captured while a focus point was set on a focus window over the region.

The display device 802b may be further configured to select, from the plurality of audio references in the received media content, a first audio reference that corresponds to the identified gaze point 812. Finally, the display device 802b may be configured to control playback of the selected first image frame and the selected first audio reference onto a display portion of the display device 802b.

Figure 9:
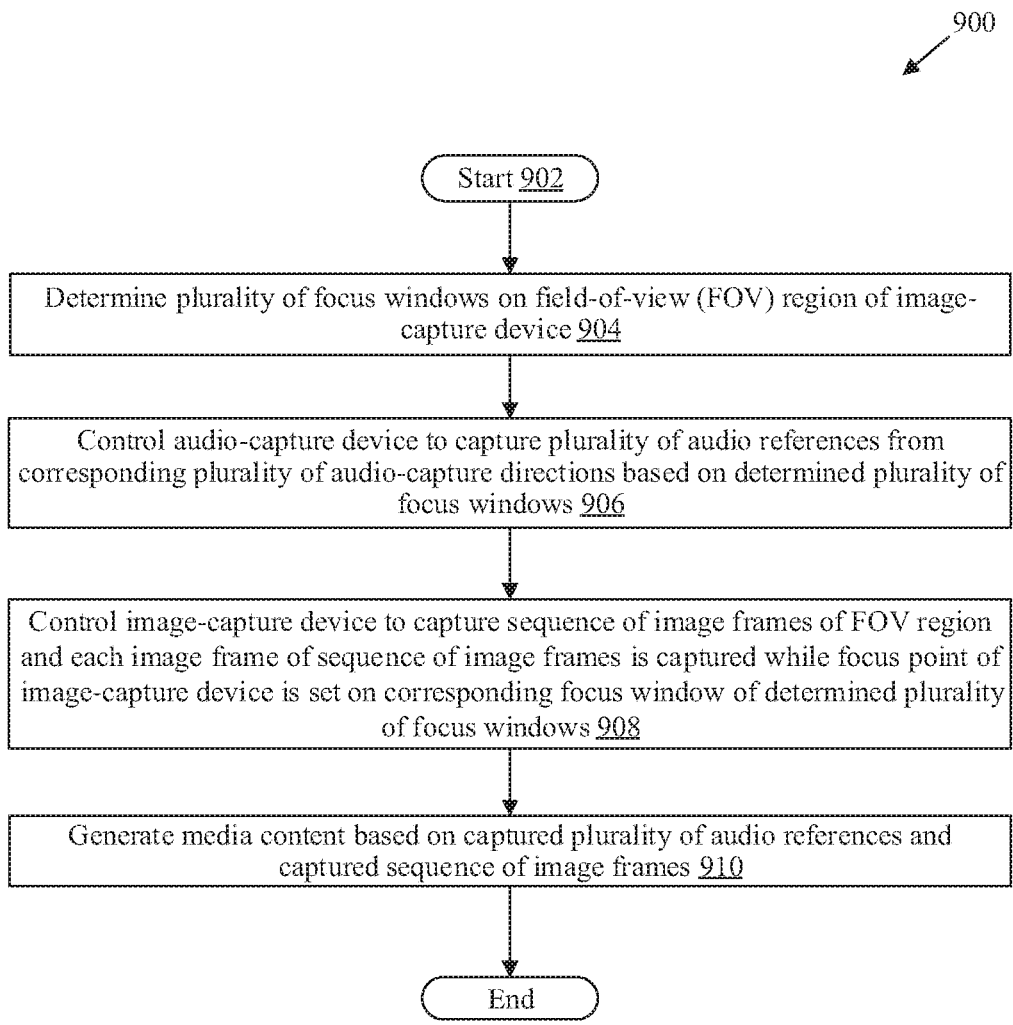
FIG. 9 is a flowchart that illustrates exemplary operations for generation of media content having multi-focus video and multi-directional audio, in accordance with an embodiment of the disclosure.

FIG. 9 is a flowchart that illustrates exemplary operations for generation of media content having multi-focus video and multi-directional audio, in accordance with an embodiment of the disclosure. FIG. 9 is explained in conjunction with elements from FIGS. 1, 2, 3, 4, 5, 6, 7, 8a, and 8b. With reference to FIG. 9, there is shown a flowchart 900. The operations from 902 to 910 may be implemented by any computing device, for example, by the electronic apparatus 102. The operations may start at 902 and proceed to 904.

At 904, the plurality of focus windows 114a, 114b . . . 114n on the FOV region 112 of the image-capture device 102a may be determined. In accordance with an embodiment, the circuitry 202 may be configured to determine the plurality of focus windows 114a, 114b . . . 114n on the FOV region 112 of the image-capture device 102a. Details of the determination of the plurality of focus windows 114a, 114b . . . 114n are described in detail, for example, in FIGS. 4 and 5.

At 906, the audio-capture device 104 may be controlled to capture a plurality of audio references from a corresponding plurality of audio-capture directions based on the determined the plurality of focus windows 114a, 114b . . . 114n. In accordance with an embodiment, the circuitry 202 may be configured to control the audio-capture device 104 to capture the plurality of audio references from the corresponding plurality of audio-capture directions based on the determined plurality of focus windows 114a, 114b . . . 114n.

At 908, the image-capture device 102a may be controlled to capture a sequence of image frames of the FOV region 112 and each image frame of the sequence of image frames may be captured while a focus point of image-capture device 102a is set on a corresponding focus window of the determined plurality of focus windows 114a, 114b . . . 114n. In accordance with an embodiment, the circuitry 202 may be configured to control the image-capture device 102a to capture the sequence of image frames of the FOV region 112.

At 910, media content may be generated based on the captured plurality of audio references and the captured sequence of image frames. In accordance with an embodiment, the circuitry 202 may be configured to generate the media content based on the captured plurality of audio references and the captured sequence of image frames. Control may pass to an end.

Various embodiments of the disclosure may provide a non-transitory computer readable medium and/or storage medium having stored thereon, instructions executable by a machine and/or a computer to operate an electronic apparatus. The instructions may cause the machine and/or computer to perform a set of operations that include a determination of a plurality of focus windows on a FOV region of the image-capture device. The set of operations may include a control of the audio-capture device to capture a plurality of audio references from a corresponding plurality of audio-capture directions based on the determined plurality of focus windows and a control of the image-capture device to capture a sequence of image frames of the FOV region. Each image frame of the sequence of image frames may be captured while a focus point of the image-capture device is set on a corresponding focus window of the determined plurality of focus windows. The set of operations may further include generation of media content based on the captured plurality of audio references and the captured sequence of image frames.

Exemplary aspects of the disclosure may provide the electronic apparatus 102 that includes the image-capture device 102a and the circuitry 202. The circuitry 202 may be communicatively coupled to the audio-capture device 104 and the image-capture device 102a. As an example, the audio-capture device 104 may be a directional recording device. As another example, the audio-capture device 104 may include a plurality of microphones placed in proximity of a corresponding plurality of audio sources in the FOV region. The circuitry 202 may be configured to determine a plurality of focus windows on a FOV region of the image-capture device 102a. The circuitry 202 may be further configured to control the audio-capture device 104 to capture a plurality of audio references from a corresponding plurality of audio-capture directions based on the determined plurality of focus windows. The circuitry 202 may be further configured control the image-capture device 102a to capture a sequence of image frames of the FOV region. Each image frame of the sequence of image frames may be captured while a focus point of the image-capture device 102a is set on a corresponding focus window of the determined plurality of focus windows. The circuitry 202 may be further configured to generate media content based on the captured plurality of audio references and the captured sequence of image frames.

In accordance with an embodiment, the circuitry 202 may be configured to receive a first user input corresponding to a selection of a number of focus windows on the FOV region of the image-capture device 102a. Based on the received first user input, the circuitry 202 may be further configured to determine the plurality of focus windows on the FOV region of the image-capture device 102a. The first user input may be received in a preview stage of the image-capture device 102a. Alternatively, in some embodiments, the circuitry 202 may be configured to detect a plurality of objects-of-interest in the FOV region of the image-capture device 102a and compare a number of objects-of-interest in the detected plurality of objects-of-interest with the number of focus windows corresponding to the received first user input. The circuitry 202 may be configured to determine the plurality of focus windows on the FOV region of the image-capture device 102a based on the comparison.

In accordance with an embodiment, the electronic apparatus 102 may further include a display device 102b communicatively coupled to the image-capture device 102a. The circuitry 202 may be configured to control the display device 102b to display a plurality of provisional focus windows based on the received first user input and receive a second user input corresponding to a selection of a default focus window of the displayed plurality of provisional focus windows. Additionally, the circuitry 202 may be configured to receive a third user input corresponding to a change in a size or a position of at least one focus window of the displayed plurality of provisional focus windows on the FOV region. The circuitry 202 may be further configured to determine the plurality of focus windows on the FOV region of the image-capture device 102a based on the received second input and/or the third user input.

In accordance with an embodiment, the circuitry 202 may be further configured to receive a fourth user input corresponding to a selection of a maximum number of focus windows on the FOV region of the image-capture device 102a. Thereafter, based on the received fourth user input, the circuitry 202 may be further configured to determine the plurality of focus windows on the FOV region of the image-capture device 102a.

In accordance with an embodiment, the circuitry 202 may be further configured to determine the plurality of audio-capture directions based on the determined plurality of focus windows.

In accordance with an embodiment, the circuitry 202 may be further configured to control the image-capture device 102a to set the focus point on the corresponding focus window along an audio-capture direction from where a corresponding audio reference of the plurality of audio references is captured.

In accordance with an embodiment, the image-capture device 102a may include a plurality of image sensors. The FOV region of each image sensor of the plurality of image sensors may be same. The circuitry 202 may be configured to control the plurality of image sensors to set a corresponding plurality of focus points on the determined plurality of focus windows of the FOV region and capture the sequence of image frames while the corresponding plurality of focus points is set on the plurality of focus windows of the FOV region.

In accordance with an embodiment, the sequence of image frames may be captured at a first frame rate and the circuitry 202 may be configured to determine a second frame rate for playback of the generated media content on the display device 106 based on the determined plurality of focus windows.

In accordance with an embodiment, the image-capture device 102a may be a 360° camera having a 360° FOV that includes a plurality of FOV regions and the FOV region is one of the plurality of FOV regions. The circuitry 202 may be configured to determine a subsequent plurality of focus windows for each subsequent FOV region of the plurality of FOV regions of the 360° FOV. Further, the circuitry 202 may be configured to control the audio-capture device 104 to capture a subsequent plurality of audio references from a subsequent plurality of audio-capture directions for each subsequent FOV region of the plurality of FOV regions. The subsequent plurality of audio references may be captured based on the determined subsequent plurality of focus windows for a corresponding subsequent FOV region of the plurality of FOV regions. The circuitry 202 may be further configured to control the image-capture device 102a to capture a subsequent sequence of image frames for each subsequent FOV region of the plurality of FOV regions. Each image frame of the subsequent sequence of image frames may be captured while the focus point is set on a corresponding focus window of the determined subsequent plurality of focus windows of a corresponding FOV region of the plurality of FOV regions. The circuitry 202 may be further configured to generate subsequent media content for each subsequent FOV region of the plurality of FOV regions based on the captured subsequent sequence of image frames and the captured subsequent plurality of audio references.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. An electronic apparatus, comprising:
   an image-capture device; and
   circuitry communicatively coupled to an audio-capture device and the image-capture device, wherein the circuitry is configured to:
   receive a first user input corresponding to a selection of a number of focus windows on a field-of-view (FOV) region of the image-capture device;
   detect a plurality of objects-of-interest in the FOV region of the image-capture device;
   compare a number of objects-of-interest in the detected plurality of objects-of-interest with the number of focus windows corresponding to the received first user input;
   determine a plurality of focus windows on the FOV region of the image-capture device based on the comparison;
   control the audio-capture device to capture a plurality of audio references from a corresponding plurality of audio-capture directions based on the determined plurality of focus windows;
   control the image-capture device to capture a sequence of image frames of the FOV region,
   wherein each image frame of the sequence of image frames is captured while a focus point of the image-capture device is set on a corresponding focus window of the determined plurality of focus windows; and
   generate media content based on the captured plurality of audio references and the captured sequence of image frames.

2. The electronic apparatus according to claim 1, wherein the circuitry is further configured to determine the plurality of focus windows on the FOV region of the image-capture device based on the received first user input,
   wherein the first user input is received in a preview stage of the image-capture device.

3. The electronic apparatus according to claim 1, further comprising a display device communicatively coupled to the image-capture device, wherein the circuitry is further configured to:
   control the display device to display a plurality of provisional focus windows based on the received first user input;
   receive a second user input corresponding to a selection of a default focus window of the displayed plurality of provisional focus windows;
   receive a third user input corresponding to a change in at least one of a size or a position of at least one focus window of the displayed plurality of provisional focus windows on the FOV region; and
   determine the plurality of focus windows on the FOV region of the image-capture device based on the received second user input and the received third user input.

4. The electronic apparatus according to claim 1, wherein the circuitry is further configured to:
   receive a second user input corresponding to a selection of a maximum number of focus windows on the FOV region of the image-capture device; and
   determine the plurality of focus windows on the FOV region of the image-capture device based on the received second fourth user input.

5. The electronic apparatus according to claim 1, wherein the audio-capture device is a directional recording device.

6. The electronic apparatus according to claim 1, wherein the audio-capture device comprises a plurality of microphones placed in proximity of a corresponding plurality of audio sources in the FOV region.

7. The electronic apparatus according to claim 1, wherein the circuitry is further configured to determine the plurality of audio-capture directions based on the determined plurality of focus windows.

8. The electronic apparatus according to claim 1, wherein the circuitry is further configured to control the image-capture device to set the focus point on the corresponding focus window along an audio-capture direction from where a corresponding audio reference of the plurality of audio references is captured.

9. The electronic apparatus according to claim 1, wherein the image-capture device comprises a plurality of image sensors, wherein
   the FOV region of each image sensor of the plurality of image sensors is same, and
   the circuitry is further configured to control the plurality of image sensors to:
   set a corresponding plurality of focus points on the determined plurality of focus windows of the FOV region; and
   capture the sequence of image frames while the corresponding plurality of focus points is set on the plurality of focus windows of the FOV region.

10. The electronic apparatus according to claim 1, wherein
    the sequence of image frames are captured at a first frame rate, and
    the circuitry is further configured to determine a second frame rate for playback of the generated media content on a display device based on the determined plurality of focus windows.

11. The electronic apparatus according to claim 1, wherein
    the image-capture device is a 360° camera having a 360° FOV that comprises a plurality of FOV regions, and
    the FOV region is one of the plurality of FOV regions.

12. The electronic apparatus according to claim 11, wherein the circuitry is further configured to determine a subsequent plurality of focus windows for each subsequent FOV region of the plurality of FOV regions of the 360° FOV.

13. The electronic apparatus according to claim 12, wherein
    the circuitry is further configured to control the audio-capture device to capture a subsequent plurality of audio references from a subsequent plurality of audio-capture directions for each subsequent FOV region of the plurality of FOV regions, and wherein the subsequent plurality of audio references is captured based on the determined subsequent plurality of focus windows for a corresponding subsequent FOV region of the plurality of FOV regions.

14. The electronic apparatus according to claim 13, wherein
the circuitry is further configured to control the image-capture device to capture a subsequent sequence of image frames for each subsequent FOV region of the plurality of FOV regions, and
each image frame of the subsequent sequence of image frames is captured while the focus point is set on a corresponding focus window of the determined subsequent plurality of focus windows of a corresponding FOV region of the plurality of FOV regions.

15. The electronic apparatus according to claim 14, wherein the circuitry is further configured to generate subsequent media content for each subsequent FOV region of the plurality of FOV regions based on the captured subsequent sequence of image frames and the captured subsequent plurality of audio references.

16. A method, comprising:
receiving a first user input corresponding to a selection of a number of focus windows on a field-of-view (FOV) region of an image-capture device;
detecting a plurality of objects-of-interest in the FOV region of the image-capture device;
comparing a number of objects-of-interest in the detected plurality of objects-of-interest with the number of focus windows corresponding to the received first user input;
determining a plurality of focus windows on the FOV region of the image-capture device based on the comparison;
capturing a plurality of audio references from a corresponding plurality of audio-capture directions based on the determined plurality of focus windows;
controlling the image-capture device to capture a sequence of image frames of the FOV region,
wherein each image frame of the sequence of image frames is captured while a focus point of the image-capture device is set on a corresponding focus window of the determined plurality of focus windows; and
generating media content based on the captured plurality of audio references and the captured sequence of image frames.

17. The method according to claim 16, further comprising:
receiving the generated media content;
partitioning the FOV region into a plurality of tiled regions based on an image resolution of the sequence of image frames in the received media content;
identifying a gaze point of user's eyeball on a display device;
selecting a first tile region from the plurality of tiled regions based on the identified gaze point; and
determining a blur value of a region corresponding to the selected first tile region in each image frame of the sequence of image frames of the received media content;
selecting, from the sequence of image frames, a first image frame having the region for which the determined blur value is a minimum;
selecting, from the plurality of audio references in the received media content, a first audio reference from an audio-capture direction that corresponds to identified gaze point; and
rendering the selected first image frame and the selected first audio reference.

18. The method according to claim 16, further comprising:
receiving the generated media content;
partitioning the FOV region into a plurality of tiled regions based on an image resolution of the sequence of image frames in the received media content;
determining a set of user-faces that lie within a viewing angle of a display device;
selecting a first user-face as a priority user-face from the determined set of user-faces;
identifying a gaze point of the selected first user-face on the display device;
selecting a first tile region from the plurality of tiled regions based on the identified gaze point; and
determining a blur value of a region corresponding to the selected first tile region in each image frame of the sequence of image frames of the received media content;
selecting, from the sequence of image frames, a first image frame having the region for which the determined blur value is a minimum;
selecting, from the plurality of audio references in the received media content, a first audio reference from an audio-capture direction that corresponds to identified gaze point; and
rendering the selected first image frame and the selected first audio reference.

19. A non-transitory computer-readable medium having stored thereon, computer-executable instructions that when executed by an electronic apparatus, causes the electronic apparatus to execute operations, the operations comprising:
receiving a first user input corresponding to a selection of a number of focus windows on a field-of-view (FOV) region of an image-capture device;
detecting a plurality of objects-of-interest in the FOV region of the image-capture device;
comparing a number of objects-of-interest in the detected plurality of objects-of-interest with the number plurality of focus windows corresponding to the received first user input;
determining a plurality of focus windows on the FOV region of the image-capture device based on the comparison;
capturing a plurality of audio references from a corresponding plurality of audio-capture directions based on the determined plurality of focus windows;
controlling the image-capture device to capture a sequence of image frames of the FOV region,
wherein each image frame of the sequence of image frames is captured while a focus point of the image-capture device is set on a corresponding focus window of the determined plurality of focus windows; and
generating media content based on the captured plurality of audio references and the captured sequence of image frames.

20. An electronic apparatus, comprising:
an image-capture device; and
circuitry communicatively coupled to an audio-capture device and the image-capture device, wherein the circuitry is configured to:
receive a first user input corresponding to a selection of a number of focus windows on a field-of-view (FOV) region of the image-capture device;

control a display device to display a plurality of provisional focus windows based on the received first user input;
receive a second user input corresponding to a selection of a default focus window of the displayed plurality of provisional focus windows;
receive a third user input corresponding to a change in at least one of a size or a position of at least one focus window of the displayed plurality of provisional focus windows on the FOV region;
determine a plurality of focus windows on the FOV region of the image-capture device based on the received second user input and the received third user input;
control the audio-capture device to capture a plurality of audio references from a corresponding plurality of audio-capture directions based on the determined plurality of focus windows;
control the image-capture device to capture a sequence of image frames of the FOV region,
wherein each image frame of the sequence of image frames is captured while a focus point of the image-capture device is set on a corresponding focus window of the determined plurality of focus windows; and
generate media content based on the captured plurality of audio references and the captured sequence of image frames.

* * * * *